United States Patent Office 3,396,190
Patented Aug. 6, 1968

3,396,190
PROCESS FOR ALIPHATIC NITRILES
Dorothee M. McClain and Irving L. Mador, Cincinnati, Ohio, assignors to National Distillers and Chemical Corporation, New York, N.Y., a corporation of Virginia
No Drawing. Filed Oct. 11, 1965, Ser. No. 494,961
18 Claims. (Cl. 260—465.1)

ABSTRACT OF THE DISCLOSURE

A process for the preparation of alkyl mononitriles and mixtures thereof with alkenyl mononitriles by the reaction of a primary alkyl amine with oxygen in the presence of a Group VIII noble metal-containing catalyst, e.g. palladium or platinum group metals, salts and oxides. The reaction may be carried out at temperatures ranging from about 90° to 175° C. and at atmospheric or near atmospheric pressures.

---

The present invention relates to an improved process for the preparation of aliphatic nitriles. More particularly, the invention pertains to an improved process for the preparation of such nitriles from aliphatic amines.

In recent years, a number of processes have been proposed for the preparation of lower aliphatic nitriles. One such process is described in U.S. Patent No. 2,481,826 and comprises reacting an olefin with ammonia in the presence of oxygen to produce the desired aliphatic nitriles. Although it is stated that the use of an oxidation catalyst, e.g. vanadium oxide, will enhance the process, the presence of such a catalyst apparently was not considered to be an essential feature of the invention. An earlier patent, U.S. Patent No. 2,381,470, is also concerned with a process for the preparation of nitriles and amines wherein ammonia is reacted with an olefin in the presence of certain specific catalysts such as the reduced oxides of nickel or cobalt. The reaction mixture comprising, for example, ammonia and ethylene is contacted with the aforementioned catalysts at a reaction temperature within the range of about 450° to 750° F., and pressures of at least 500 pounds per square inch, and preferably from 1000 to 3000 pounds per square inch. The latter patent states that under these reaction conditions and utilizing the nickel or cobalt catalysts, there are a number of competing reactions including cracking, polymerization, dehydrogenation, and hydrogenation as well as the initial amination of the olefinic starting material. Certain operation conditions, such as the use of higher reaction temperatures, apparently result in increased nitrile formation. In the specific embodiment of this process, both low and high boiling fractions were separated from the reaction product mixture and were found to contain various amines and nitriles. Obviously, the variety of products and by-products formed involves problems of separation and recovery.

One object of the present invention is to provide an improved process for the preparation of aliphatic nitriles.

Another object of the present invention is to provide an improved catalytic process for the preparation of aliphatic nitriles from primary amines.

A further object of the present invention is to provide a process wherein primary amines are reacted with oxygen in the presence of certain catalysts to produce aliphatic nitriles.

These and other objects of the present invention will become readily apparent from the ensuing description and illustrative embodiments.

In accordance with the present invention, it has now been found that aliphatic nitriles can be effectively prepared by contacting a reaction mixture comprising a primary amine and oxygen with a Group VIII noble metal-containing catalyst. This vapor phase process is conducted at a temperature within the range of about 90° to 175° C., and preferably within the range of about 100° to 130° C. The use of atmospheric or near atmospheric pressures is preferred, although pressures up to about 1000 p.s.i. and especially up to 100 p.s.i. may be employed without encountering deleterious results. The ability to carry out the process of this invention without the elevated temperatures and pressures prescribed in the prior art processes is an important advantage.

The amine starting material is a primary amine having from 2 to 6 carbon atoms per molecule including such alkyl amines as ethylamine, propylamine, butylamine, isobutylamine, hexylamine, and mixtures thereof. The use of either ethylamine or propylamine is especially preferred. It will be understood that the source of the starting material is unimportant.

The source of the oxygen is also unimportant, and for economic reasons it may be desirable to employ air as the source of the oxygen. Nevertheless, it will be understood that substantially purified molecular oxygen can be employed to achieve particularly outstanding results.

The molar ratio of the amine to oxygen may range from about 1/0.1 to 1/1.5 in order to achieve maximum utilization of the feed materials and to minimize the amount of unreacted feed which generally must be recycled in large scale commercial operations, the molar ratio of reactants is preferably maintained at about 6/1.

In accordance with another aspect of the present invention, it was found that water may be present in the reaction mixture and, in general, favors increased yields of the aliphatic nitrile. This beneficial effect of water, in the form of water vapor, will be specifically illustrated hereinafter. The molar ratio of amine to water will range from about 4/1 to 50/1 and preferably from about 6/1 to 10/1.

The theoretical reasons for the attainment of increased yields of the aliphatic nitrile by the use of water is not fully understood at this time. Moreover, it will be understood that the use of water as a component of the reaction feed mixture is not an essential feature of the instant invention, and that the reaction can be effectively carried out even in its absence.

The use of a Group VIII noble metal-containing catalyst is one of the most important features of the present invention. The catalyst can be any member of the platinum group or the palladium group of metals or an oxide or a salt thereof, either organic or inorganic. Preferably the catalyst is a Group VIII noble metal, salt or oxide, specific examples of which include palladium, platinum, rhodium, ruthenium, osmium, iridium, palladous benzoate, palladous acetate, palladous propionate, ruthenium acetate, platinous benzoate, rhodium acetate, palladous chloride, rhodium trichloride, rhodium oxide, ruthenium chloride, ruthenium oxide, iridium chloride, and the like as well as mixtures thereof. The use of palladium metal is especially preferred.

The catalyst may be unsupported or supported on a suitable inert material such as carbon, silica, alumina, or the like. The use of an alumina support is preferred. It is also possible to increase the activity of the catalyst, if desired, by the addition of from about 1 to 10 equivalents per equivalent of metal catalyst of an alkali metal salt or a metal halide promoter or mixtures of such promoters. Illustrative compounds which may be employed for this purpose include sodium acetate, potassium acetate, lithium hydroxide, calcium oxide, cobalt chloride, ferric chloride, ferric bromide, ferric acetate, cupric chloride, cupric acetate, manganese chloride, chromium chloride, sodium chloride, etc. An alkali metal salt, and especially sodium acetate, is the preferred promoter.

The process of this invention may be carried out in either a continuous or batch manner utilizing conventional vapor phase reaction equipment. The catalyst may either be employed in the form of a fixed or fluidized bed. It is also possible to employ conventional separation procedures for separating the desired aliphatic nitrile products from the gaseous reaction product mixture which, in addition to the aliphatic nitriles, may contain unreacted feed materials and by-products. As previously discussed, commercial operations would generally entail the recovery and recycling of unreacted feed materials. It will be further understood that neither the exact method of carrying out the present process nor the product recovery method are critical features of this invention.

The invention will be more fully understood by reference to the following illustrative embodiments.

Example I

A glass reactor was filled with a catalyst bed of 2 percent palladium metal supported on alumina pellets. The reactor was jacketed so that it could be externally heated. The temperature was raised to 120° C. with a flow of dry nitrogen through the bed. At 120° C. the flow was switched to a stream of oxygen which was bubbled through an aqueous solution of 70 percent ethylamine prior to entering the reactor. The effluent gas from the reactor was passed through a trap, cooled to about −25° C., containing dimethylformamide as a trapping liquid. Aliquots of the trap contents were gas chromatographed and shown to contain acetonitrile by comparison of elution time with a known sample of acetonitrile. Portions of the eluted peaks from chromatograph were collected, and the identification of acetonitrile was confirmed by mass spectrographic analysis.

Example II

The same procedure of Example I was repeated except that the stream of oxygen was bubbled through an aqueous solution of 25% n-propylamine prior to entering the reactor. The effluent gas from the reactor was passed through a trap cooled to −30° C. Aliquots of the trap contents were gas chromatographed and shown to contain a mixture of acrylonitrile and propionitrile by comparison with elution times of known samples of acrylonitrile and propionitrile.

The above data show that acetonitrile can be readily prepared from ethylamine by the process of this invention. It is also demonstrated that mixtures of acrylonitrile and propionitrile can be prepared from n-propylamine by the practice of the present invention. The use of atmospheric pressure and reaction temperatures which are much lower than those required in the known processes are important advantages, especially for commercial installations. A further advantage resides in the avoidance of a reaction product mixture containing numerous nitrogen-containing compounds which would require elaborate separation steps and equipment for recovery of the desired nitrile products.

While particular embodiments of this invention are shown above, it will be understood that the invention is obviously subject to variations and modifications without departing from its broader aspects.

What is claimed is:

1. A process for the production of hydrocarbyl mononitriles selected from alkyl mononitriles and mixtures thereof with alkenyl mononitriles which comprises contacting in the vapor phase a reaction feed mixture consisting essentially of a primary alkyl amine having from 2 to 6 carbon atoms per molecule and oxygen with Group VIII noble metals or oxides, lower alkanoate, benzoate, and inorganic acid salts thereof, catalyst at a temperature within the range of about 90° to 175° C.

2. The process of claim 1 wherein said amine is ethylamine.

3. The process of claim 1 wherein the molar ratio of amine to oxygen is within the range of about 1/0.1 to 1/1.5.

4. The process of claim 1 wherein said catalyst is palladium metal.

5. The process of claim 1 wherein said catalyst is supported on an inert carrier.

6. The process of claim 5 wherein said carrier is alumina.

7. The process of claim 1 wherein said temperature is within the range of about 100° to 130° C. and the reaction is carried out at about ambient pressure up to about 100 p.s.i.

8. A process for the preparation of acetonitrile which comprises contacting in the vapor phase a gaseous feed mixture consisting essentially of ethylamine and oxygen with palladium metal catalyst at an elevated temperature within the range of about 90° to 175° C.

9. The process of claim 8 wherein said gaseous feed mixture contains a minor amount of water vapor in a molar ratio of ethylamine to water ranging from about 4/1 to 50/1.

10. The process of claim 8 wherein the molar ratio of ethylamine to oxygen is about 6/1.

11. The process of claim 8 wherein said catalyst is supported on an inert carrier.

12. The process of claim 11 wherein said catalyst is supported on alumina.

13. The process of claim 8 wherein said temperature is within the range of about 90° to 130° C., and the reaction is carried out at ambient pressure up to 100 p.s.i.

14. A process for the preparation of a mixture of acrylonitrile and propionitrile which comprises contacting in vapor phase a gaseous feed mixture consisting essentially of n-propylamine and oxygen with palladium metal catalyst at an elevated temperature within the range of about 90° to 175° C.

15. The process of claim 14 wherein said gaseous feed mixture contains a minor amount of water vapor in a molar ratio of n-propylamine to water ranging from about 4/1 to 50/1.

16. The process of claim 14 wherein said catalyst is supported on an inert carrier.

17. The process of claim 16 wherein said inert carrier is alumina.

18. The process of claim 14 wherein said temperature is within the range of about 90° to 130° C., and the reaction is carried out at ambient pressure up to 100 p.s.i.

References Cited

UNITED STATES PATENTS

| | | | |
|---|---|---|---|
| 2,375,016 | 5/1945 | Marple et al. | 260—465.9 |
| 2,388,218 | 10/1945 | Olin | 260—465.1 |
| 2,849,478 | 8/1958 | Zubay et al. | 260—465.9 X |

JOSEPH P. BRUST, *Primary Examiner.*